No. 738,100. PATENTED SEPT. 1, 1903.
H. F. CUNTZ.
AUTOMOBILE CONTROLLING MECHANISM.
APPLICATION FILED JUNE 12, 1903.
NO MODEL. 2 SHEETS—SHEET 1.

Witnesses.
Rudolph Riege.
M. L. Clark

Inventor:
Hermann F. Cuntz

No. 738,100. PATENTED SEPT. 1, 1903.
H. F. CUNTZ.
AUTOMOBILE CONTROLLING MECHANISM.
APPLICATION FILED JUNE 12, 1903.
NO MODEL. 2 SHEETS—SHEET 2.
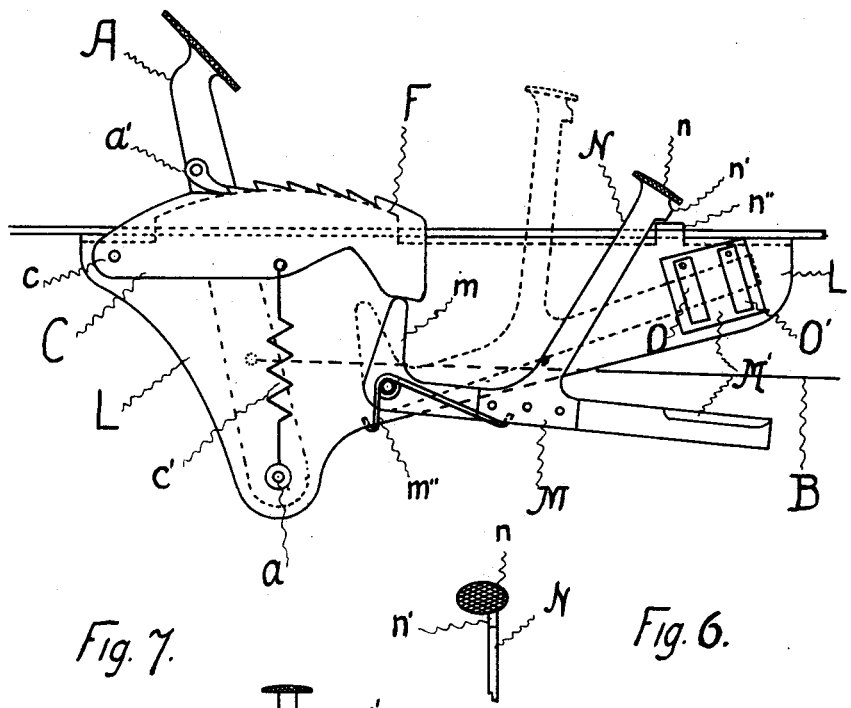
Fig. 4.
Fig. 5.
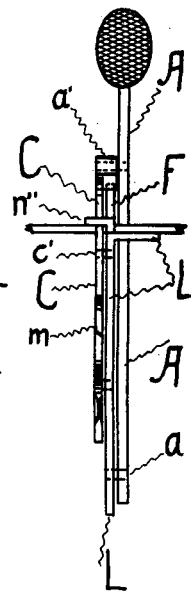
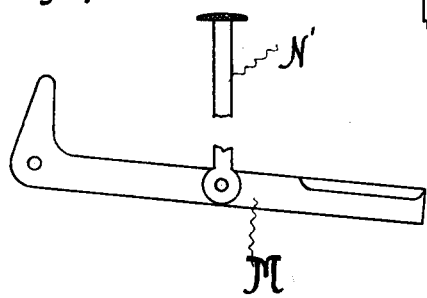
Fig. 7.
Fig. 6.
Witnesses.
Rudolph Riege.
M. L. Clark
Inventor:
Hermann F. Cuntz No. 738,100. Patented September 1, 1903.

UNITED STATES PATENT OFFICE.

HERMANN F. CUNTZ, OF HARTFORD, CONNECTICUT, ASSIGNOR TO ELECTRIC VEHICLE COMPANY, OF JERSEY CITY, NEW JERSEY, A CORPORATION OF NEW JERSEY.

AUTOMOBILE-CONTROLLING MECHANISM.

SPECIFICATION forming part of Letters Patent No. 738,100, dated September 1, 1903.

Application filed June 12, 1903. Serial No. 161,220. (No model.)

*To all whom it may concern:*

Be it known that I, HERMANN F. CUNTZ, a citizen of the United States, and a resident of Hartford, in the county of Hartford, State of Connecticut, have invented certain new and useful Improvements in Automobile-Controlling Mechanism, of which the following is a specification.

This invention relates to means for the control of automobiles, and more particularly mechanism which will prevent attempts at operating the vehicle while the brakes or brake are applied, and may be used in other combinations when similar conditions exist.

The main object of the invention in an electric vehicle is to prevent throwing on the current for an attempted starting of the vehicle when the vehicle has been at rest and the brake is locked in the "on" position. While I now know that prior to my invention hereof it was suggested and mechanisms were made to always cut out the electric current upon the application of the brake, such a mechanism would be totally inoperative on many occasions in the practical use of electrically-propelled automobiles. A form of my invention I embody in a mechanism operated from the controller, whereby it is possible to lock the brake or brakes in engaged or on position only when the controlling-lever is in an "off" position, and, vice versa, a movement of the controller-lever in anything but the off position would release the brake unless it were purposely held by the operator to meet particular conditions which would warrant applying current at the same time the brake is on. Another object is to produce a simple form of foot-operated mechanism to effect generally the same results.

I have illustrated my invention as embodied in controlling mechanism for an automobile in the accompanying drawings, in which—

Figure 1:
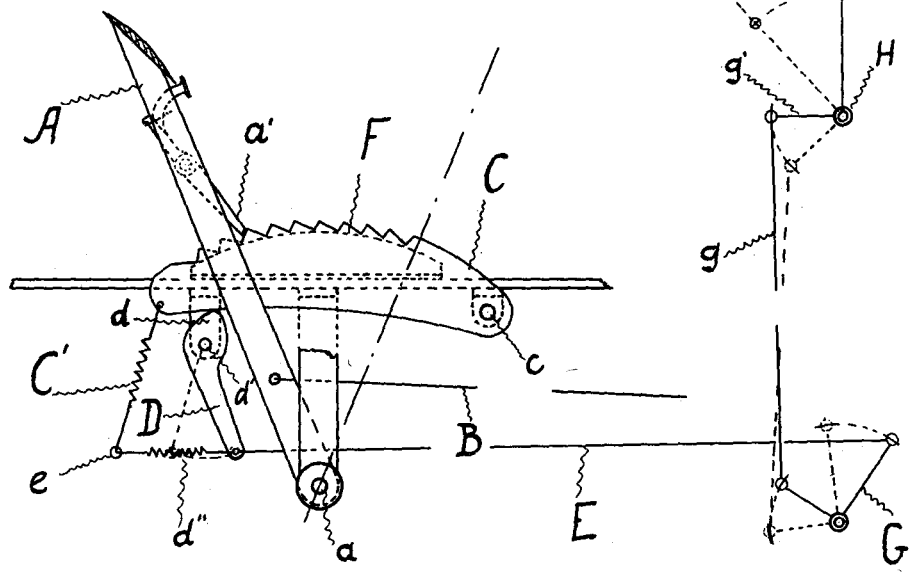
Figure 2:
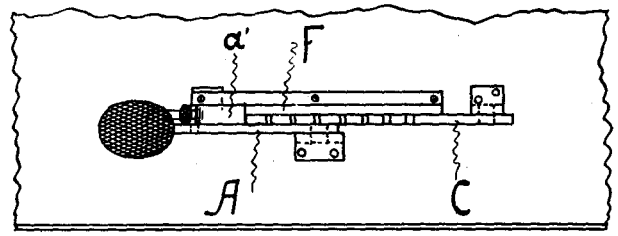
Figure 3:
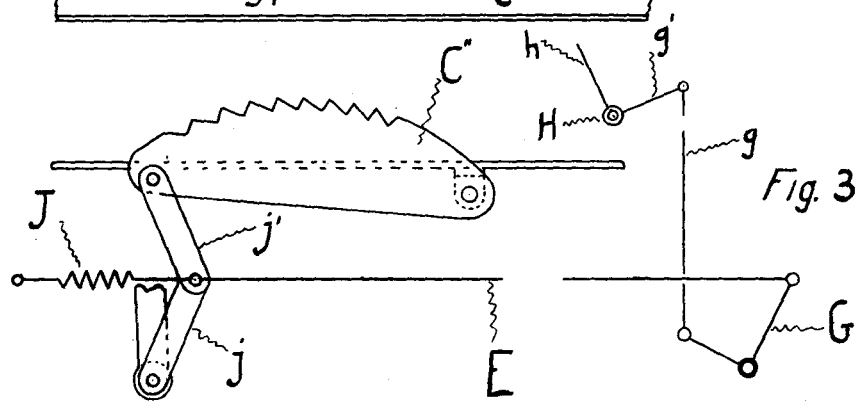

Figure 1 is a side view of a brake foot-lever with connection to the controller, diagrammatically shown. Fig. 2 is a plan of the braking foot-lever and locking and release mechanism shown in Fig. 1. Fig. 3 shows in part the mechanism of Fig. 1 with certain details changed and in part diagrammatic. Fig. 4 is a side elevation of a modified form of the invention shown to accomplish the result by means of a foot-lever and foot-press. Fig. 5 is an end elevation of the parts shown in Fig. 4, embodying my invention in a modified and more compact form. Fig. 6 is an end view to show foot-press $n$ of Fig. 4, which is broken away in Fig. 5. Fig. 7 is side view of modified form of foot-press switch members.

In Fig. 1, A is a brake-lever, fulcrumed at $a$ with a connection B, diagrammatically shown, which is the draw or pull rod of a band, shoe, or any other brake. (Not shown.)

C is a serrated member pivoted at $c$ and moved by a cam $d$ on the lever D, which is pivoted at $d'$.

A spring $C'$ attaches to a fixed point $e$, while a spring $d''$ attaches to the extremity of D. Back of the pivoted serrated plate C is a fixed plate F of a curvature substantially coinciding with the extremities of the teeth when the serrated lever is in a depressed position.

On the brake-operating lever is a pawl $a'$, spring-operated, so as to engage the teeth on C when the latter pivoted plate is in a position whereby the serrations may engage said pawl. To cam-lever D is also attached (diagrammatically shown) rod E, which attaches to bell-crank G, which in turn connects by rod $g$ to an arm $g'$ on controller H, which has the handle $h$ projecting upwardly for its operation, (all these last levers, rods, and controller being diagrammatically shown as sufficient for the purpose of this description.)

In Fig. 2 the plan view shows the serrated plate C, with the lever A and the fixed smooth-edge plate F in their relative positions, which is side by side, for purposes as will hereinafter more particularly appear.

Fig. 3 illustrates a construction, generally speaking, the same as in Fig. 1, only the bell-crank and rod connections (diagrammatically shown) are such that upon the operation of the controller-lever $h$ the effort which is transmitted to release the brake-locking mechanism is tension in the connections, so that very light members, such as properly-fashioned wire and adjustable and flexible connections, may be readily used without tendency to buckle or bend, with still the required strength necessary to move the serrated pivoted plate under all conditions. In this construction the movement of the serrated plate C'' is effected by means of a toggle consisting of j and j', with a spring J, which tends to pull the toggle in a direction to throw the plate C'' upward for engagement with the pawl on the brake-lever.

The operation of this mechanism will now be readily understood, as follows: Upon the movement of the lever A by means of the foot-press at its upper extremity the brake is applied, retarding the vehicle, and we will assume it as brought to a standstill. The brake-operating lever then is held by means of the pawl $a'$ engaging the serrations on plate C when in the position as shown in Fig. 1. This is assuming that the controlling-lever on the vehicle $h$ is in its initial or zero position—that is, when the power is not applied, as in an electric vehicle when the electrical controller is on the off position—passing no current to the motors. As soon as the controlling-lever $h$ is thrown forward through the connections $g'$ and $g$ and G and rod E the cam-lever D is released and the spring $d''$, pulling its lower end, retreats the cam from the lower edge of member C, while C' in turn pulls the serrated plate C down, thereby releasing the pawl $a'$ of the brake-operating lever, which in turn permits immediate release of the brake.

In the form shown in Fig. 3 the release of the pawl by the movement of the serrated plate is not dependent upon the spring action, but is positive by means of the toggle connections, which is desirable for the reason that in heavy vehicles or in the case of a powerful operator the brake-operating foot-lever will be pressed to a point where great tension of the parts causes the pawl to engage its coöperating teeth with such force that a spring might not be satisfactory at all times as releasing means.

In Fig. 4 plate L forms a base or frame for the attachment of the operating-lever A with its pivotal connection $a$, while also a support for the pivoted plate C, with its serrated upper edge, the plate being pivoted at $c$, while also supporting a switch comprising knife-blade and lever M, to one extremity of which is attached a cam $m$, the knife-blade comprising a component part of the electrical switch M'. This lever also carries an upright portion N, with a foot-press $n$ at its upper end, the upright having a small notch or stop $n'$. To this plate are also attached switch members O and O', to which are connected the wires carrying the power to the motors or otherwise constituting controlling-circuit essential to the operation of the vehicle. Attached to the plate C is a spring $c'$.

The operation of this mechanism is as follows: The switch foot-press N when as shown in dotted position permits current to pass, and therefore operation of the vehicle, and at the same time the cam $m$ at the other end of the switch-knife lever M is in such a position that the spring $c'$ pulls the serrated plate C downward, so that a plain plate F on the far side of C, as shown in Fig. 4, projects above the serrations and engages the pawl $a'$ on a brake-operating lever, thus preventing its being locked in any position. This plate F is here an integral part—namely, an upturned edge of main plate L. Under these conditions the operator may press the brake-lever A forward and apply the brake at will; but the same will not remain locked in position under any circumstances. He must be, therefore, conscious of the application of the brake when operating the power-controlling lever of the vehicle. When stopping the vehicle, however, and it becomes necessary to lock the brake to prevent the vehicle from moving when left alone, as on an incline, the operator must depress the switch foot-press N, which throws up the plate-carrying serrations, and therefore engages the pawl and holds or locks the brake-lever in any on position desired. By such operation of the foot-press N the current, however, is cut out, and the power cannot be applied to the motors of the vehicle without again releasing the foot-press, which in turn will release the pivoted plate C and in turn release the brake, simultaneously closing the circuit. The switch foot-press having the small stop $n'$, engaging the floor-plate at $n''$, is prevented from any further movement than would leave the top of the press $n$ a sufficient distance above the floor to permit the operator's foot to readily engage and raise it, which raising will, however, be almost automatic after the first slight movement, as it will be aided by the spring $m''$ as well as the spring $c'$, pulling the plate C downward. It is also possible in this combination to use a toggle-lever connection which would make the movement of the serrated plate more positive, which, however, may not be necessary in view of the fact that in this construction I have pivoted the serrated plate at that end where the brake-lever pawl engages with the greatest force, in view of which the spring attachment at the opposite end can in all cases be made sufficient to readily release the same.

It will be seen that under all running conditions nothing prevents the conscious application by the operator of the brake to meet special conditions. This last embodiment, as seen, is intended to be made on a single plate or bed to insure proper functioning of all parts and also to permit the manufacture of a finished article applicable as a whole to a vehicle otherwise finished.

Fig. 6 shows how the foot-press $n$ at upper end of switch-operating member N projects laterally in embodiment shown, so that being kept above floor by stop $n'$ engaging $n''$ the operator can catch it with his foot to raise or release that mechanism, and that press and lever N are also, as seen, so arranged that operator's foot can by a push force the switchblade M into the contacts o o' when fitting tight. In Fig. 7 the press N' is for simplicity of manufacture pinned to M and then works vertically through an opening in floor portion of base-plate L.

Various modifications of the details of construction are still within the scope of my invention, and it is not my intention to be limited to the precise form and modification herein shown and described; but

What I claim, and desire to secure by Letters Patent, is—

1. In a motor-vehicle, a brake, means for locking said brake, source of power, means for regulating or controlling the application of the power, and connections whereby said brake-locking means is not effective when the power is applied.

2. The combination in a motor-vehicle, a brake, brake-locking means, a controller for regulating the application of the power, and connections for releasing the brake when the power is applied.

3. In a motor-vehicle, brake-operating mechanism, and means for locking the same in a predetermined position, power-controlling mechanism, and connections between the latter and the brake-locking mechanism whereby a predetermined movement of the controlling means releases the brake-locking mechanism.

4. In a motor-vehicle, brake-operating mechanism and locking means therefor, power-controlling lever and connections whereby a movement of said lever to apply power or increase the power applied releases the brake-locking mechanism, substantially as and for the purpose described.

5. In a motor-vehicle, a source of power-supply, a controlling-lever, a serrated member in proximity thereto, having a movement for engagement with said operating-lever, connecting means whereby the movement of said serrated member into engagement with said operating-lever is effected only with the cutting off of the source of power-supply to said vehicle.

6. In a motor-vehicle a mechanism comprising in a single structure as a whole detachable and attachable to said vehicle, a brake-operating member, a device for locking said member or brake in predetermined position, a switch for the control of the power of said vehicle and switch-operating mechanism.

7. In a motor-vehicle, a self-contained mechanism comprising a brake-operating lever, adjustable means for locking said lever in predetermined position, a switch for the control of the power of said vehicle, switch-operating mechanism, said switch-operating mechanism and brake-locking mechanism coacting whereby the adjustment of the locking means into operative position is possible only upon the cutting out of the current.

This specification signed and witnessed this 10th day of June, A. D. 1903.

HERMANN F. CUNTZ.

In presence of—
M. L. CLARK,
RUDOLPH RIEGE.